J. H. VINTON.
SWINGING BRACKET FOR HEEL SHAPING MACHINES.
APPLICATION FILED JULY 30, 1920.

1,405,879.

Patented Feb. 7, 1922.

Inventor:
John H. Vinton,
by his attorney,
Charles S. Gooding.

UNITED STATES PATENT OFFICE.

JOHN H. VINTON, OF KEENE, NEW HAMPSHIRE, ASSIGNOR TO BAXTER D. WHITNEY & SON, INC., OF WINCHENDON, MASSACHUSETTS, A CORPORATION OF MASSACHUSETTS.

SWINGING BRACKET FOR HEEL-SHAPING MACHINES.

1,405,879.  Specification of Letters Patent.  Patented Feb. 7, 1922.

Application filed July 30, 1920. Serial No. 400,184.

*To all whom it may concern:*

Be it known that I, JOHN H. VINTON, a citizen of the United States, residing at Keene, in the county of Cheshire and State of New Hampshire, have invented new and useful Improvements in Swinging Brackets for Heel-Shaping Machines, of which the following is a specification.

This invention relates to a swinging bracket which is particularly adapted to be used in connection with machines for shaping heels, the object of the invention is to provide a bracket with a bearing or bearings therein for a shaft which has both a reciprocatory and a rocking motion. In machines for shaping heels there is always produced a large amount of fine wood dust which gets into the bearings and absorbs the oil so that the bearings become dry and to a certain extent inoperative.

This invention has for its object to provide a swinging bracket with bearings which overcome this difficulty. The class of machine in which the device of this invention is particularly adapted to be used is fully shown and described in the application for Letters Patent by me Serial No. 369,437 filed March 27th, 1920 to which reference may be had for a more complete understanding of the use of this invention.

The invention consists in the combination and arrangement of parts set forth in the following specification and particularly pointed out in the claims.

Referring to the drawings.

Like numerals refer to like parts throughout the several views of the drawings.

Figure 1:
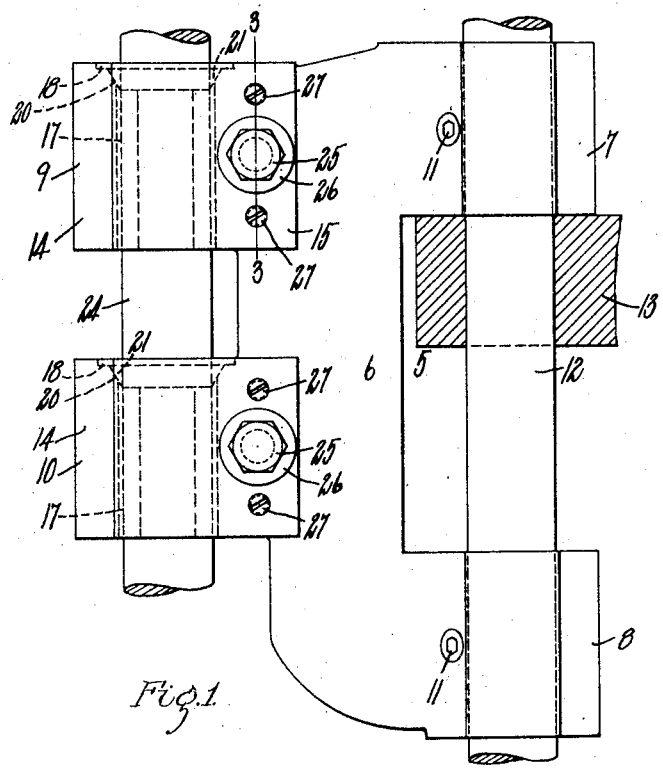
Figure 1 is a side elevation of a swinging bracket embodying my invention.
Figure 2:
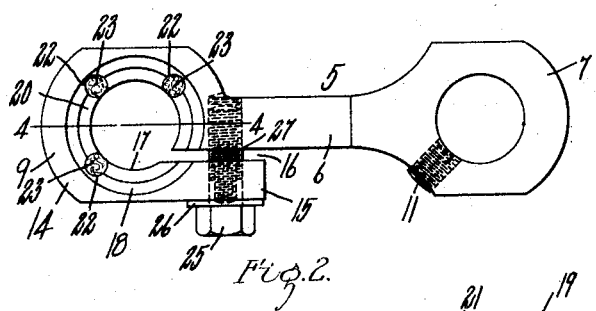
Fig. 2 is a plan view of the same.
Figures 3, 4:
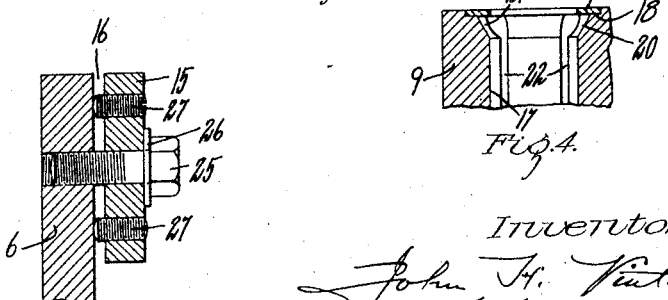
Fig. 3 is a detail sectional elevation taken on the line 3—3, Figure 1.
Fig. 4 is a detail sectional elevation taken on the line 4—4, Figure 2.

In the drawings 5 is a swinging bracket constructed in accordance with my invention and comprising a body portion 6, a pair of ears 7 and 8 and a pair of bearings 9 and 10. The ears 7 and 8 are fastened by set screws 11 to a shaft 12 which is arranged to rock in bearings, one of which 13 only is shown in the drawings, Figure 1. Bearings 9 and 10 are practically duplicates of each other and each consists of a split sleeve portion 14 integral with the body portion 6 of the bracket and terminating in an ear 15 adjacent to said body portion but separated therefrom by a space 16. Said sleeve portion is provided with a bore 17 extending therethrough and terminating at its upper end in an annular groove 18 in which is located a washer 19. The annular groove 18 is connected to the bore 17 by a conical portion 20 which constitutes an oil chamber 21. A plurality of ducts 22 are provided in each of the bearings which extend longitudinally therethrough and are preferably cylindrical in form and terminate at their upper ends in the oil chamber 21. The oil ducts 22 are each provided with a piece of absorbent material such as felt 23 which conducts the oil from the chamber 21 to a shaft 24, said shaft in heel shaping machines being adapted both to slide and to rock in said bearings. It will be seen that the washer 19 serves as a cover for the oil chamber 21 and for the ducts 22 to prevent dust from entering the same and absorbing the oil in the chamber and in the felt contained in the ducts.

In order to take up any wear or back lash in the bearings 9 and 10 each of them are provided with a screw 25 which has screw-threaded engagement with the body portion 6 and which extends through the ear 15. A washer 26 is preferably inserted between the head of the screw 25 and the ear 15. By advancing the screw 25, the sleeve portion 14 is contracted on account of the ear 15 being moved toward the body portion 6. In order to accurately adjust the ear toward or away from the body portion 6 two stop screws 27 are provided in each of the ears 15 and these stop screws have screw-threaded engagement with the ear 15 and abut against the adjacent face of the body portion 6, thus by turning the stop screws 27 to advance or retract the same and then screwing up on the screw 25 the position of the ear 15 relatively to the body portion 6 may be accurately determined and fixed.

The object of having three oil ducts in the bore of the bearing is that the periphery of the shaft 24 may be thoroughly lubricated throughout its entire extent as the shaft 24 does not rotate but rocks backwardly and forwardly. It is desirable that there should be a plurality of ducts thus making sure that oil is distributed throughout the entire surface or periphery of the shaft 24.

The operation of the device hereinbefore described is as follows:—The swinging bracket, as a whole, is fastened to the shaft 12 by the set screws 11 and the shaft 12 rocks in the bearing 13. The shaft 24 moves upwardly and downwardly in the bearings 9 and 10 and the oil is fed to the shaft in said bearings by the felt 23 in the ducts 22 from the chamber 21.

I claim:

1. A swinging bracket having, in combination, a body portion, a split sleeve integral with said body portion and having a bore constituting a bearing for a shaft, said sleeve terminating at one side thereof in an ear adjacent to said body portion and means to adjust said ear relatively to said body portion whereby the diameter of said bore may be increased or diminished, one end of said bore being bevelled to form an oil chamber.

2. A swinging bracket having, in combination, a body portion, a split sleeve integral with said body portion and having a bore constituting a bearing for a shaft, said sleeve terminating at one side thereof in an ear adjacent to said body portion and means to adjust said ear relatively to said body portion whereby the diameter of said bore may be increased or diminished, said sleeve being provided at its upper end with an annular groove and a washer located in said groove, the upper end of said bore being connected to said annular groove by a bevelled portion constituting an oil chamber.

3. A swinging bracket having, in combination, a body portion, a split sleeve integral with said body portion and having a bore constituting a bearing for a shaft, said sleeve terminating at one side thereof in an ear adjacent to said body portion and means to adjust said ear relatively to said body portion whereby the diameter of said bore may be increased or diminished, said sleeve being provided at its upper end with an annular groove and a washer located in said groove, the upper end of said bore being connected to said annular groove by a bevelled portion constituting an oil chamber, said sleeve being provided with a duct opening into said bore and into said oil chamber.

4. A swinging bracket having, in combination, a body portion, a split sleeve integral with said body portion and having a bore constituting a bearing for a shaft, said sleeve terminating at one side thereof in an ear adjacent to said body portion, a screw extending through said ear and having screw-threaded engagement with said body portion and a stop screw having screw-threaded engagement with said ear and adapted to abut against said body portion whereby the diameter of said bore may be increased or diminished.

5. A swinging bracket having, in combination, a body portion, a split sleeve integral with said body portion and having a bore constituting a bearing for a shaft, said sleeve terminating at one side thereof in an ear adjacent to said body portion, and means to adjust said ear relatively to said body portion, whereby the diameter of said bore may be increased or diminished, said sleeve being provided with a plurality of ducts opening into said bore and into said oil chamber.

6. A swinging bracket having, in combination, a body portion, a split sleeve integral with said body portion and having a bore constituting a bearing for a shaft, said sleeve terminating at one side thereof in an ear adjacent to said body portion, and means to adjust said ear relatively to said body portion whereby the diameter of said bore may be increased or diminished, said sleeve being provided with an oil chamber at its upper end and with a plurality of ducts opening into said bore and into said oil chamber, and absorbent material located in said ducts and adapted to feed oil to a shaft located in said bore.

In testimony whereof I have hereunto set my hand in presence of two subscribing witnesses.

JOHN H. VINTON.

Witnesses:
CHARLES S. GOODING,
CATHERINE M. JOYCE.